(12) United States Patent
Ferenc et al.

(10) Patent No.: US 10,046,674 B1
(45) Date of Patent: Aug. 14, 2018

(54) ADJUSTING DEVICE FOR LONGITUDINAL ADJUSTMENT OF A VEHICLE SEAT AND METHOD FOR ASSEMBLY

(71) Applicant: Brose Fahrzeugteile GmbH & Co. KG, Coburg, Coburg (DE)

(72) Inventors: Anthony Ferenc, Goodrich, MI (US); Umesh Handigol, Rochester, MI (US); Leo Ioppolo, Washington, MI (US)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 15/618,168

(22) Filed: Jun. 9, 2017

(51) Int. Cl.
*F16M 13/00* (2006.01)
*B60N 2/07* (2006.01)
*B60N 2/08* (2006.01)

(52) U.S. Cl.
CPC .............. *B60N 2/0735* (2013.01); *B60N 2/07* (2013.01); *B60N 2/0727* (2013.01); *B60N 2/0806* (2013.01); *B60N 2/0705* (2013.01)

(58) Field of Classification Search
CPC ...... B60N 2/0735; B60N 2/07; B60N 2/0727; B60N 2/0806
USPC ......... 248/429, 424; 296/65.01, 65.11, 65.13
See application file for complete search history.

(56) References Cited

U.S. PATENT DOCUMENTS

| | | | | |
|---|---|---|---|---|
| 5,209,447 A | * | 5/1993 | Yokota | ................. F16O 29/082 248/429 |
| 6,364,272 B1 | * | 4/2002 | Schuler | ................. B60N 2/072 248/424 |
| 2005/0224680 A1 | | 10/2005 | Strubel et al. | |
| 2010/0207419 A1 | | 8/2010 | Kojima et al. | |
| 2011/0233367 A1 | | 9/2011 | Mizuno et al. | |

FOREIGN PATENT DOCUMENTS

DE        20313951        1/2005

* cited by examiner

*Primary Examiner* — Todd M Epps
(74) *Attorney, Agent, or Firm* — Renner, Otto, Boisselle & Sklar, LLP

(57) ABSTRACT

An adjusting device for longitudinal adjustment of a vehicle seat including: a guide rail 2 and a guided sliding rail 1; a stop member 7 mounted to the guide rail 2 for limiting the travel stroke of the sliding rail 1; and a positioning member 4 for positioning the guide rail 2, wherein the positioning member 4 has a first end and a second end fixed to the guide rail 2, a first threaded portion 40 is provided at the second end, extending through a through-hole 22 of the guide rail 2, and a positioning portion 44 for positioning the guide rail 2 relative to the vehicle floor is provided at the first end and outside of the hollow space 8. The first threaded portion 43 is in engagement with a second threaded portion 49 which is mated to the first threaded portion 43 and coupled with the stop member 7.

22 Claims, 5 Drawing Sheets

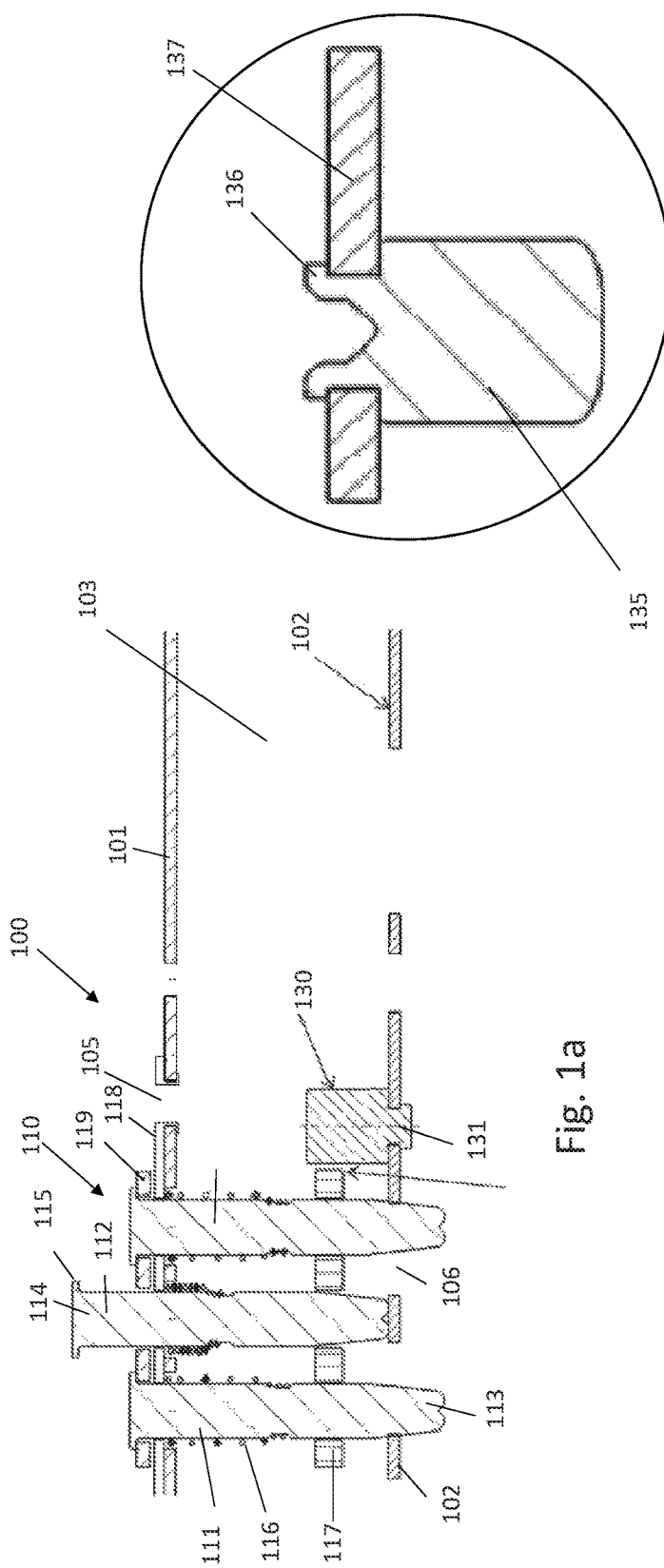

ADJUSTING DEVICE FOR LONGITUDINAL ADJUSTMENT OF A VEHICLE SEAT AND METHOD FOR ASSEMBLY

FIELD OF INVENTION

The present invention relates to an adjusting device for longitudinal adjustment of a vehicle seat, particularly of a motor vehicle seat, and to method for assembly of such an adjusting device.

BACKGROUND

Such an adjusting device comprises at least a fixed lower rail (hereinafter guide rail) and an upper rail (hereinafter sliding rail) that is adjustable and guided in the longitudinal direction along the guide rail. In such a longitudinal adjustment device two guide rails are disposed in parallel with each other in the longitudinal direction of the motor vehicle, while the motor vehicle seat is mounted to the corresponding sliding rails. The sliding rails are adjustable and guided in the longitudinal direction along the lower rails and can be secured in their positions with respect to the lower rails by means of a locking device.

FIG. 1a shows a first example of such a conventional adjusting device 100 comprising a guide rail 102, a plurality of through holes 106 being formed in a bottom thereof, and a sliding rail 101 having a plurality of through-holes 105. Guide rail 102 and sliding rail 101 are assembled together to form a rectangular hollow inner space 103. A locking device 110 having a plurality of spring-biased locking pins 111 is fixed to an upper side of the sliding rail 101 and is used for locking the position of the sliding rail 101 relative to the guide rail 102 at selectable positions by engagement of the locking pins 111 with a plurality of openings 106 formed in a bottom of the guide rail 102. The locking pins 111 are guided in bores formed in a guiding web 117 fixed at a side-wall of the guide rail 102.

FIGS. 2a and 2b show further details of a conventional locking device 110 as disclosed e.g. in German Utility Model DE 20313951 U1 of the Applicant. The locking device 110 comprises a lifting lever 119 with slots 120 for engagement with the radial protrusions 115 formed at the upper ends 114 of the locking pins 111. For releasing the locking pins 111 from the holes 106 in the bottom of guide rail 2 (cf. FIG. 1a) by lifting the locking pins 111, the lifting lever 119 is lifted by pushing handling lever 121

Conventionally, positioning pins are used for positioning the guide rail 102 relative to a vehicle floor (not shown), particularly when mounting the adjusting device 100 in a vehicle. FIG. 1b shows in a magnified view an example of such a positioning pin 135, which is fixed to the bottom of the guide rail 102 by riveting so that an expanded riveted head 136 is formed at an upper end of the positioning pin 135. Usually, this positioning pin 135 (also known as locator pin) is attached to a riser 137 via a staking process, and the riser 137 is fixed to the guide rail 102.

Considering that the adjusting device 100 shown in FIG. 1a is manually actuated for adjusting the longitudinal position of the vehicle seat, a stop feature needs to be provided as indicated by the arrow in FIG. 1a, for limiting the travel stroke of the sliding rail 101 relative to the guide rail 102. More specifically, according to FIG. 1a the stop feature is implemented by the interaction of an end stop pin 130 and the opposite end of the guiding web 117 of the locking device 110. Conventionally, such stop pins 130 need to be installed after the sliding rail 101 and the guide rail 102 are married together to form the profile of the adjusting device 100, and for this purpose the stop pins 130 are usually fixed to the guide rail 102 via a staking process, as shown in FIG. 1a.

Installing a positioning pin and a stop feature of the afore-mentioned type during assembly of the adjusting device is often difficult, given rail lengths, customer-specific floor mounting and travel requirements. Installing conventionally also requires two separate staking processes during assembly, which increases time and costs for assembly and may cause a risk of mechanical damages to the rails that might also impair the appearance of the adjusting device. Accordingly, there exists further need for improvements.

Further examples of conventional adjusting devices for longitudinal adjustment of a vehicle seat are disclosed in US 2011/0233367 A1, US 2010/0207419 A1, U.S. Pat. No. 5,209,447, U.S. Pat. No. 6,346,272 B1 and US 2005/0224680 A1.

Conventional adjusting devices of the afore-mentioned type need to be optionally configured for manual operation or automatic operation by means of an electric motor. Accordingly, there is a need to implement a stop feature as outlined above and a positioning pin in a simple and cost-effective manner.

Furthermore, there is a need for providing an enhanced method for assembly of such adjusting devices in a simple and cost-effective manner.

SUMMARY OF INVENTION

According to the present invention there is provided an adjusting device for longitudinal adjustment of a vehicle seat, comprising: a guide rail configured to be coupled with a vehicle floor and a sliding rail configured to be coupled with the vehicle seat, wherein the sliding rail is movably guided in a longitudinal direction relative to the guide rail and wherein the guide rail and sliding rail together define a rectangular hollow space; a stop member mounted to the guide rail for limiting the travel stroke of the sliding rail relative to the guide rail; and a positioning member for positioning the guide rail relative to the vehicle floor. The positioning member has a first end and a second end opposite to the first end and fixed to the guide rail, wherein a first threaded portion is provided at the second end, extending through a through-hole of the guide rail, and a positioning portion for positioning the guide rail relative to the vehicle floor is provided at the first end and outside of the hollow space. According to the present invention the first threaded portion is in engagement with a second threaded portion which is mated to the first threaded portion and coupled with the stop member.

Thus, for providing a stop feature for limiting the travel stroke of the sliding rail relative to the guide rail, simply two components need to be screwed together during assembly, one of the two components having a male threaded portion and the other of the two components having a corresponding female threaded portion. According to the present invention the same components may be used to provide both a positioning pin for positioning the guide rail relative to the vehicle floor and a stop feature. Thus, according to the present invention a stop feature and a positioning pin can be implemented in a simple and cost-effective manner. At the same time, mounting the positioning member to the bottom of the guide rail may also serve for fixing additional components at the bottom of the guide rail, particularly a spindle mounting bracket of a spindle drive used for automatic adjustment of the adjusting device by an electric motor.

According to a further embodiment the first threaded portion is a male thread formed on a cylindrical portion of the positioning member and extending through the opening formed at a bottom of the guide rail, and the first threaded portion and the second threaded portion are screwed together, wherein the second threaded portion is formed in a through-hole of a counter member provided inside the hollow space. This configuration further eases assembly of the adjusting device, including a stop feature and a positioning pin.

According to a further embodiment that may be combined with any preceding embodiment an outer diameter of the cylindrical portion is smaller than in inner diameter of the through-hole, a protrusion is formed at the counter member at a side facing the second end of the positioning member, and an outer diameter of the protrusion corresponds to the inner diameter of the through-hole, so that the protrusion is snuggly accommodated in the through-hole, which further enhances the mechanical strength and stability of the assembly.

According to a further embodiment that may be combined with any preceding embodiment a first mounting plate is provided between the positioning member and the guide rail and outside the hollow space, for further positioning the positioning member relative to the guide rail.

According to a further embodiment that may be combined with any preceding embodiment the first mounting plate comprises a through-hole through which the cylindrical portion of the positioning member extends and a positioning protrusion, which is accommodated in an adjacent one of through-holes formed at the bottom of the guide rail, for preventing a rotation of the first mounting plate. Thus, the first mounting plate may be positioned more precisely, which further eases assembly of the adjusting device. Furthermore, the mechanical strength and stability of the assembly can be enhanced.

According to a further embodiment that may be combined with any preceding embodiment the counter member is a screw nut disposed inside the hollow spaces, wherein a protrusion is provided on an inner surface of the sliding rail and inside the hollow space, and the screw nut and the protrusion are cooperating for limiting the travel stroke of the sliding rail relative to the guide rail.

According to a further embodiment that may be combined with any preceding embodiment the protrusion is formed as a guiding web of a locking device used for locking the position of the sliding rail relative to the guide rail by engagement of a plurality of locking pins with a plurality of openings in the guiding web, wherein the guiding web is connected with the inner surface of the sliding rail at a distance to the bottom of the guide rail which is smaller than an axial length of the screw nut.

According to a further embodiment that may be combined with any preceding embodiment the counter member is a screw nut disposed inside the hollow spaces, wherein a protrusion is provided on an inner surface of the sliding rail and inside the hollow space, and the screw nut and the protrusion are cooperating for limiting the travel stroke of the sliding rail relative to the guide rail.

According to a further embodiment that may be combined with any preceding embodiment the counter member is a mounting bracket of a spindle drive actuated by an electric motor for longitudinal adjustment of the vehicle seat, said mounting bracket being fixed at the bottom of the guide rail inside the hollow space, wherein the stop member is formed at a housing of the spindle drive.

According to a further embodiment that may be combined with any preceding embodiment a first mounting plate is provided between the positioning member and the guide rail outside the hollow space, wherein the positioning member comprises a positioning protrusion, which is accommodated in an adjacent one of through-holes formed at the bottom of the guide rail, and the mounting bracket comprises a second positioning protrusion), which is accommodated in the adjacent one of through-holes formed at the bottom of the guide rail, for preventing a rotation of the first mounting plate.

According to a further aspect of the present invention there is provided a method for assembly an adjusting device for longitudinal adjustment of a vehicle seat, comprising the steps of: providing a guide rail of a predetermined hollow profile, a bottom of the guide rail being provided with a plurality of through-holes; providing a sliding rail of a predetermined hollow profile mated to the predetermined hollow profile of the guide rail; fixing a counter member to the guide rail or sliding rail and inside the predetermined hollow profile of the guide rail or sliding rail; assembly of the guide rail or sliding rail to form the adjusting device for longitudinal adjustment such that a hollow space is formed by the predetermined hollow profiles of the guide and sliding rail, said counter member being disposed inside the hollow space; providing a positioning member having a first end, which is provided with a positioning portion, and a second end opposite to the first end, which is provided with a first threaded portion; and fixing the positioning member to the guide rail by inserting the second end in one of the through-holes of the guide rail and screwing together the first threaded portion and a second threaded portion which is mated to the first threaded portion.

In this manner, the positioning member is coupled with a stop member mounted to the guide rail for limiting the travel stroke of the sliding rail relative to the guide rail and the positioning portion is disposed outside of the hollow space, to thereby position the guide rail relative to a vehicle floor.

OVERVIEW ON DRAWINGS

Hereinafter, the invention will be described with reference to preferred exemplary embodiments and with reference to the drawings, wherein:

FIGS. 1a and 1b show an example of an adjusting device for longitudinal adjustment according to the prior art in a cross-sectional view and a detail thereof;

FIGS. 2a and 2b show in two perspective partial top views details of a locking device for the adjusting device for longitudinal adjustment of FIG. 1a;

Throughout the drawings, like reference numerals designate identical or technically equivalent elements or groups of elements.

DETAILED DESCRIPTION OF PREFERRED EMBODIMENTS

Figure 2B:
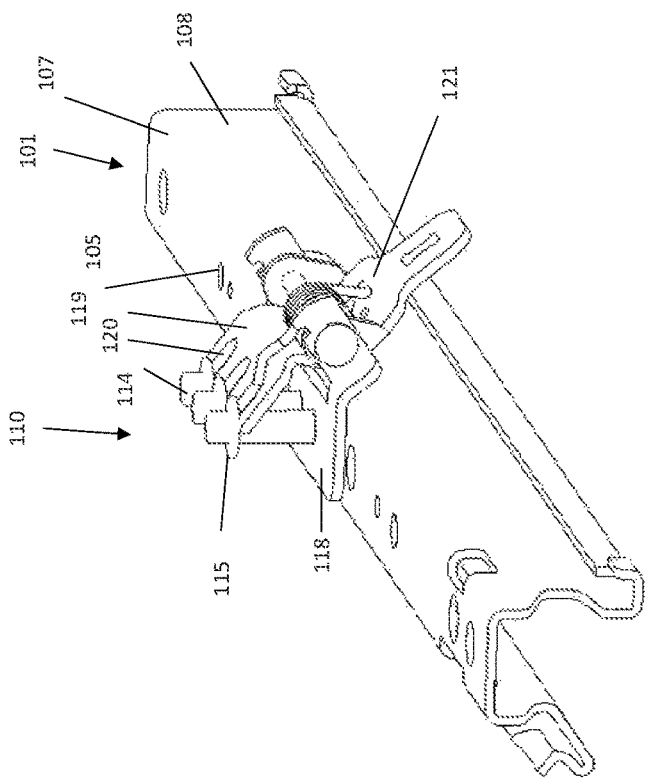
Figure 2A:
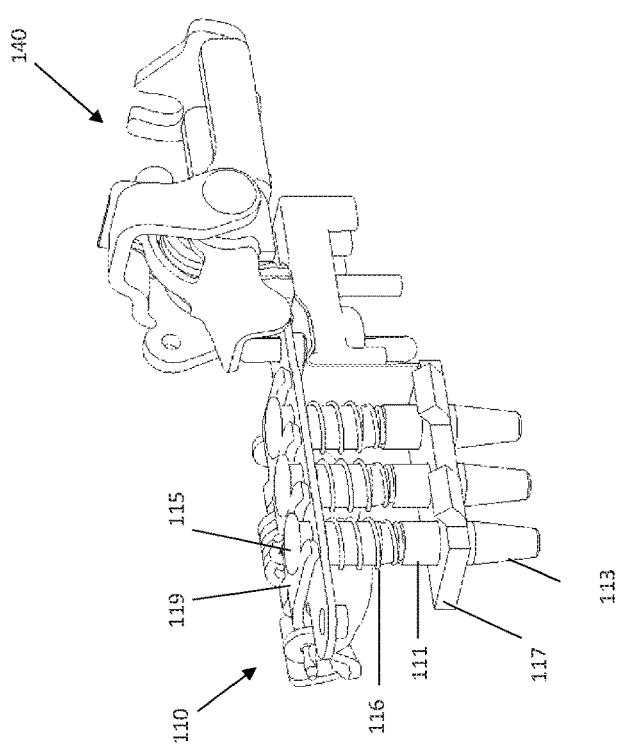
Figure 3:
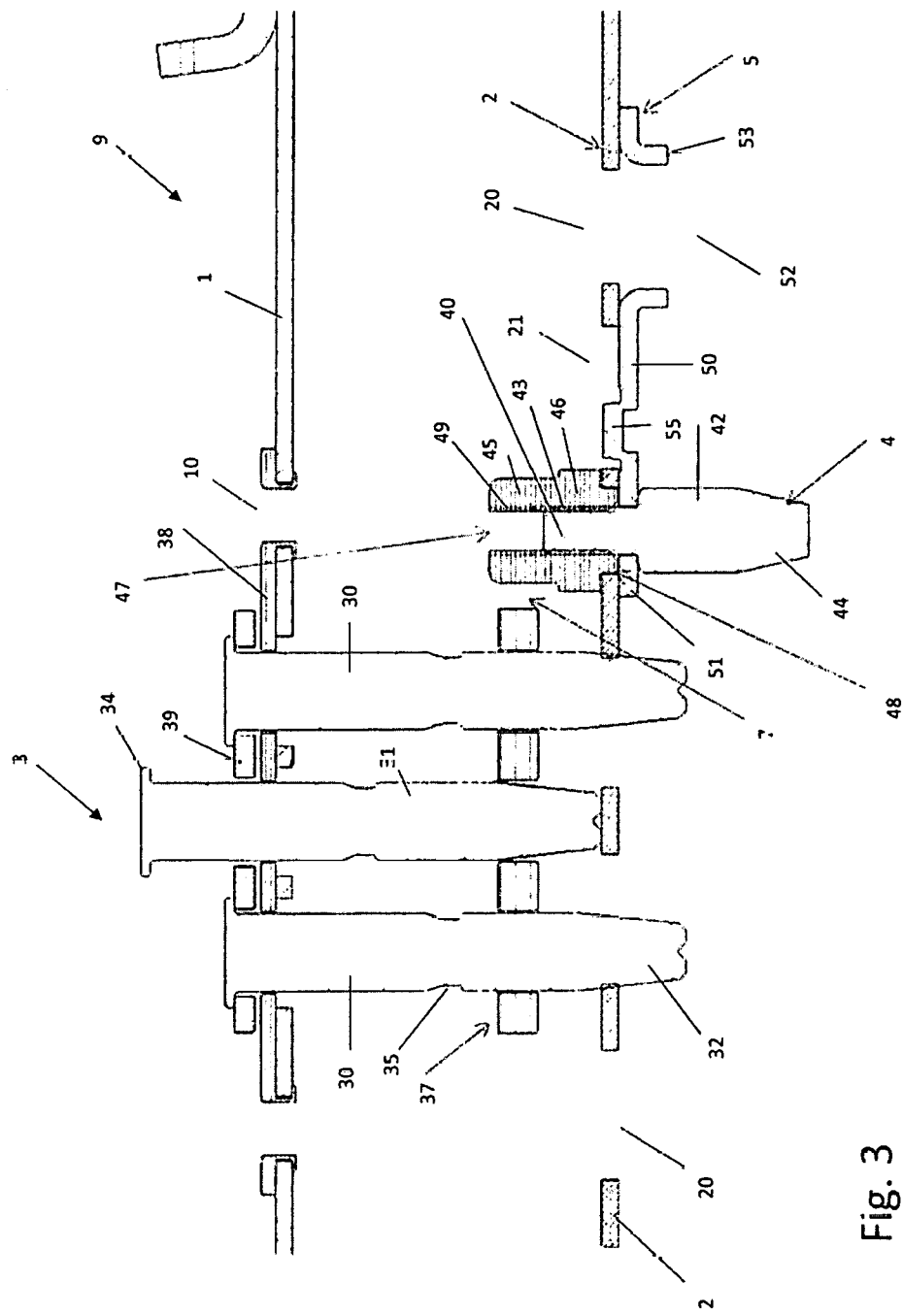
FIG. 3 shows an adjusting device for longitudinal adjustment of a vehicle seat according to a first embodiment of the present invention in a partial cross-sectional view.

FIG. 3 shows an adjusting device for longitudinal adjustment of a vehicle seat according to a first embodiment of the present invention in a partial cross-sectional view. The adjusting device 9 is configured to be operated manually by a user and comprises a guide rail 2 having a plurality of through holes 20, 21 formed in a bottom thereof and a sliding rail 1 having a plurality of through-holes 10. Guide rail 2 and sliding rail 1 are assembled together to form a rectangular hollow inner space 8. A locking device 3 of the type described above with reference to FIGS. 1a to 2b having a plurality of spring-biased locking pins 30 is fixed to an upper side of the sliding rail 1 and is used for locking the sliding rail 1 relative to the guide rail 2 at selectable positions by engagement of the locking pins 30 with a plurality of openings 20 formed in the bottom 23 of guide rail 2. The locking pins 30 are guided in bores of a guiding web 37 fixed at a side-wall of the guide rail 2. The locking device can be actuated manually in the same manner as outlined above with reference to FIGS. 2a and 2b, for releasing the locking pins 30 from the openings 20 formed in the bottom 23 of guide rail 2.

Figure 4:
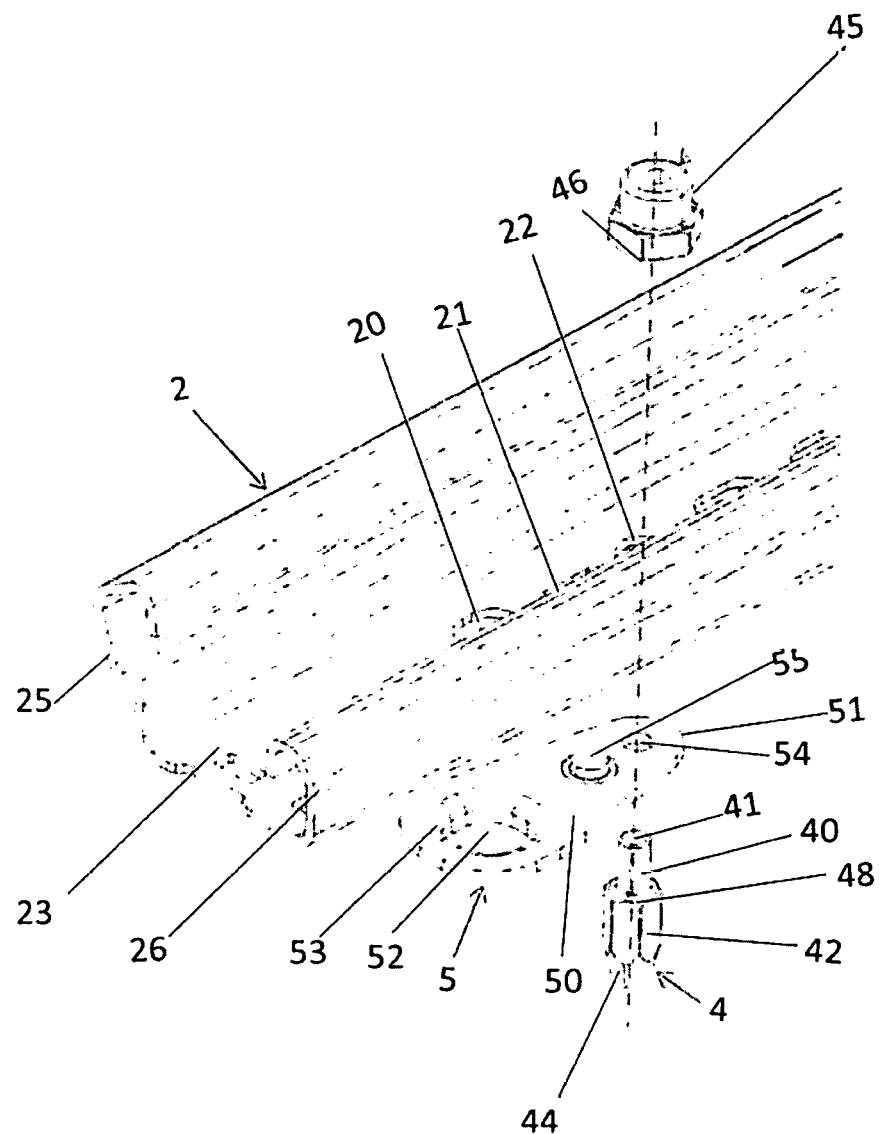
FIG. 4 shows an end portion of the guide rail of the embodiment of FIG. 3 on a larger scale and in an exploded perspective view.

A positioning pin 4 is fixed to the bottom side of guide rail 2. As shown in FIG. 4, the positioning pin 4 comprises a generally cylindrical pin body 40 forming a free second end 41 thereof, a body 42 provided with a hexagon portion and a tapered positioning portion 44 at a first (bottom) end thereof. The positioning portion 44 serves for positioning the guide rail 2 relative to a vehicle floor (not shown), particularly when mounting the adjusting device 9 in a vehicle. As shown in FIG. 3, the positioning portion 44 of positioning pin 4 is disposed outside the hollow space 8 and protrudes from the bottom 23 of guide rail 2 downward. The second end of positioning pin 4 is provided with a male thread 43 and extends through a through-hole formed in the bottom 23 of guide rail 2. At the opposite side of the through-hole the thread 43 is screwed into a female thread 49 formed in an opening of a nut disposed inside the hollow space 8. In this manner, the positioning pin 4 is fixed to the bottom 23 of guide rail 2.

For a more stable connection of the positioning pin 4 with the bottom 23 of guide rail 2, the inner diameter of through-hole 22 formed in the bottom 23 of guide rail 2 is larger than the outer diameter of the cylindrical protrusion 40 at the second end of positioning pin 4. A tubular protrusion 48 is formed in the region between the cylindrical protrusion 40 and the hexagon portion 42. The outer diameter of this tubular protrusion 48 exactly corresponds to the inner diameter of through-hole 22. Thus, when screwing nut 45 and positioning pin 4 together, the tubular protrusion 48 is snuggly accommodated in the through-hole 22.

For a more precise alignment of the positioning pin 4 at the underside of guide rail 2 a first mounting plate 50 is interposed between the underside of guide rail 2 and the hexagon portion 42 of positioning pin 4. As shown in FIG. 4, the first mounting plate has a generally rectangular-shaped portion in which a first opening 52 or through-hole is formed by a protruding skirt 53, and a tapered opposite end of generally oval shape, in which a second opening 54 or through-hole is formed. A cylindrical protrusion 55 protrudes from the upper surface of first mounting plate 50 and faces the underside of guide rail 2. When the positioning pin 4 and nut 45 are firmly screwed together, as shown in FIG. 3, the free end of tubular protrusion 48 is firmly pressed against the upper surface of first mounting plate 50. At the same time the protrusion 55 is accommodated in through-hole 21 of guide rail 2 and abuts laterally at edges of through-hole 21, thus preventing any rotation of first mounting plate 50 relative to guide rail 2.

As shown in FIG. 3, the guiding web 37 is connected with the inner surface of the sliding rail 1 at a distance to the bottom 23 of guide rail 2 which is smaller than an axial length of the screw nut 45. Thus, the screw nut 45 and the protrusion 37 are cooperating for limiting the travel stroke of the sliding rail 1 relative to the guide rail 2. Namely, in a rearward end position of the sliding rail 1 the screw nut 45 abuts at an opposite end of guiding web 37 to thereby provide a stop feature for limiting the travel stroke of the sliding rail 1 relative to the guide rail 2, as indicated by the arrow 7 in FIG. 3.

As shown in FIG. 3, in the mounted position the through-hole 20 of guide rail 2 and first opening 52 of the first mounting plate 50 are precisely aligned with each other, thus enabling penetration of other members (not shown), particularly of mounting members required for fixing the guide rail 2 and adjusting device 9 at the vehicle floor (not shown).

As will become apparent to the person skilled in the art, the nut 45 may alternatively be provided with a male thread formed at a cylindrical protrusion that extends through the opening 22 of guide rail 2 and is screwed into a corresponding female thread formed in the hexagon portion 42 of positioning pin 4.

For assembly of the adjusting device 9 of the first embodiment, according to the present invention two separate staking processes are not required anymore. Rather, after combining the sliding rail 1 and guide rail 2 with each other the cylindrical body 40 at the second end of positioning pin 4 simply needs to be pushed through the hole 54 in the first mounting plate 50 and the through-hole 22 in the bottom 23 of guide rail 2 and the screw nut 45 simply needs to be inserted from the rear end of guide rail 2 into the hollow space 8. Afterwards, the nut 45 is tightened on positioning pin 4 by screwing the hexagon portion 42 with a mounting tool, such as a wrench, and temporarily securing nut 45 in the hollow space 8. In this manner, according to the present invention the positioning pin 4, which acts as a conventional locator pin, and the stop feature 7 may be assembled in a single process step during assembly of the adjusting device 9.

Figure 5:
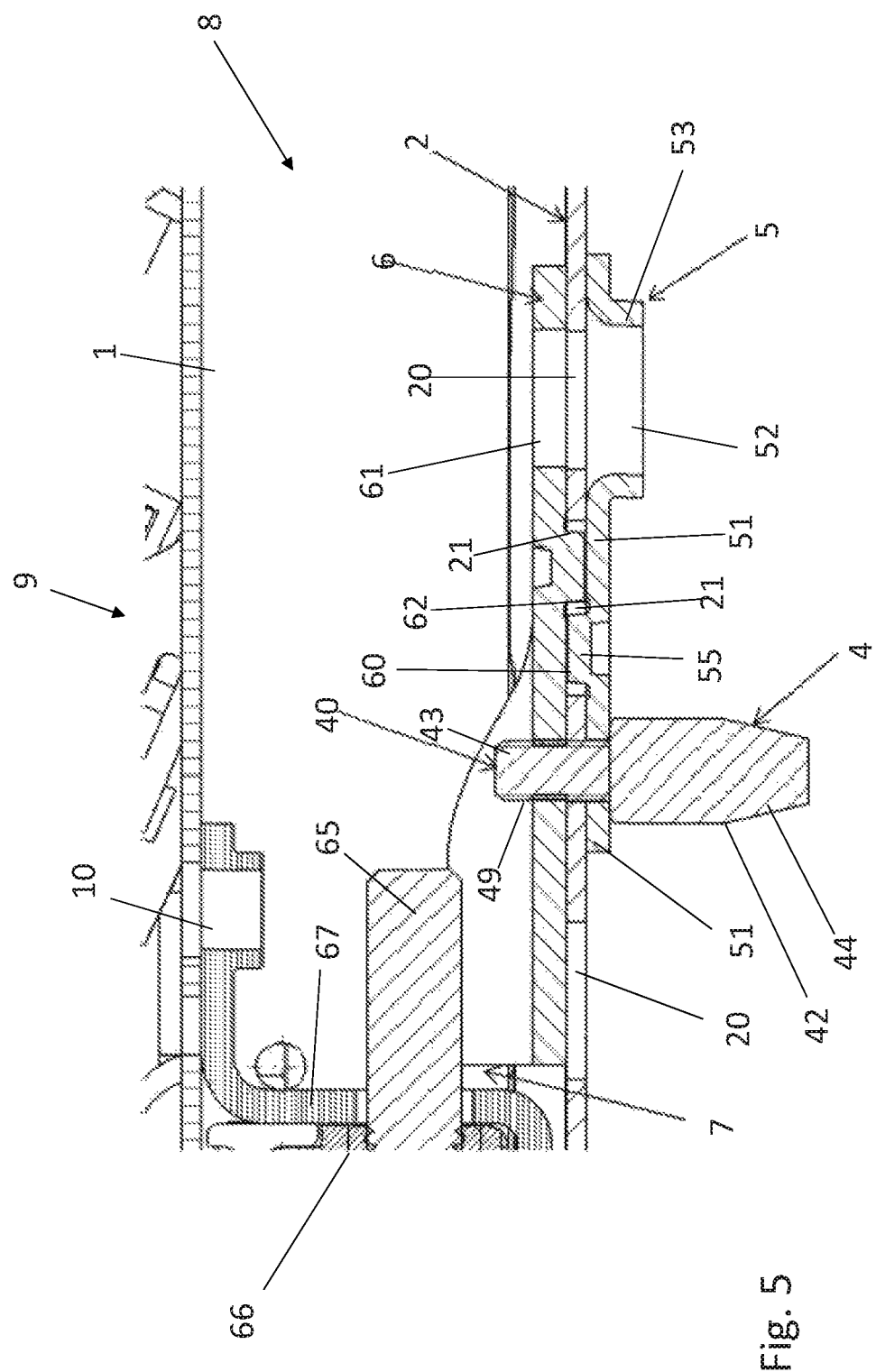
FIG. 5 shows an adjusting device for longitudinal adjustment of a vehicle seat according to a second embodiment of the present invention in a partial cross-sectional view.

FIG. 5 shows an adjusting device for longitudinal adjustment of a vehicle seat according to a second embodiment of the present invention in a partial cross-sectional view. The adjusting device 9 is generally of similar configuration as outlined above with reference to FIGS. 3 and 4 and is configured to be actuated by an electric motor for longitudinal adjustment of the vehicle seat. For this purpose, a spindle drive of generally well-known configuration is disposed inside the hollow space 8 of the adjusting device 9. FIG. 5 shows on the left-hand side only the end of a threaded spindle shaft 65 rotatably supported inside the hollow space 8 by means of a coupling portion 67. The male thread of spindle shaft 65 meshes with the female thread of spindle nut 66 coupled with coupling portion 67. As shown in FIG. 5, the coupling portion 67 extends basically across the entire hollow space 8 and particularly extends to the bottom of guide rail 2.

As compared to FIG. 3, a second mounting plate or spindle mounting bracket 60 is disposed inside the hollow space 8 and fixed to the bottom of guide rail 2. The mounting bracket 60 is of similar configuration as the first mounting plate 50 shown in FIG. 4, more preferably of identical configuration, and is formed as a generally rectangular plate having two through-holes, namely through-hole 61 and a second through-hole at the position of positioning pin 4, and a cylindrical protrusion 62 protruding from the bottom side of mounting bracket 60. At the position of positioning pin 4 the mounting bracket 60 is provided with a female thread 49 which is mated to the male thread 43 formed on the cylindrical protrusion 40 of positioning pin 4. In the mounted state, the bottom of guide rail 2 is interposed between the first mounting plate 50 and the spindle mounting bracket 60. Both first mounting plate 50 and spindle mounting bracket 60 are firmly fixed at bottom of guide rail 2 by tightening the hexagon portion 42 of positioning pin 4 using a mounting tool, such as a wrench. At the same time, the two cylindrical protrusions 55, 62 are both accommodated in the through-hole 21 of guide rail 2 and laterally limited by side edges of through-hole 21. Thus, any undesired pivoting of first mounting plate 50 and spindle mounting bracket 60 is reliably prevented. At the same time, the opening 61 of spindle mounting bracket 60, the through-hole 20 of guide rail 2 and the first opening 51 of first mounting plate 50 are in precise alignment with each other, thus enabling penetration of other members (not shown), particularly of mounting members required for fixing the guide rail 2 and adjusting device 9 at the vehicle floor (not shown).

For assembly of the adjusting device 9 of the second embodiment, according to the present invention two separate staking processes are not required anymore. Rather, after combining the sliding rail 1 and guide rail 2 with each other the spindle mounting bracket 60 simply needs to be adjusted properly so that the through-hole with the female thread 49 is in alignment with the through-hole 22 in the bottom 23 of guide rail 2 and the hole 54 in the first mounting plate 50. Afterwards, the cylindrical body 40 at the second end of positioning pin 4 simply needs to be pushed through the hole 54 in the first mounting plate 50 and the through-hole 22 in the bottom 23 of guide rail 2 and screwed into the female thread 49 of spindle mounting bracket 60 by screwing the hexagon portion 42 with a mounting tool, such as a wrench. In this embodiment, the stop feature 7 is implemented by the cooperation of the front end of spindle mounting bracket 60 and the coupling portion 67 of the spindle drive disposed inside the hollow space 8. When the spindle drive is actuated, the sliding rail 1 together with the coupling portion 67 are moved towards the rear end of guide rail 2, until the front end of spindle mounting bracket 60 abuts the coupling portion 56 of spindle drive and thus limits the travel stroke of sliding rail 1 relative to guide rail 2. According to the present invention, this stop feature 7 may be assembled in a single process step during assembly of the adjusting device 9.

As will become apparent to the person skilled in the art, the male threaded cylindrical protrusion may alternatively be provided on the bottom surface of spindle mounting bracket 60, the male threaded cylindrical protrusion extending through the opening 22 of guide rail 2 and being screwed into a corresponding female thread formed in the hexagon portion 42 of positioning pin 4.

As will become apparent to the person skilled in the art, according to the present invention the same type of positioning pin (locator pin) may be used optionally for an adjusting device configured to be manually operated and for an adjusting device configured to be automatically actuated by a spindle drive driven by an electric motor. The first mounting plate 50 disclosed above may serve as a conventional rail spacer in the first embodiment with manual operation. In the second embodiment with electric adjustment the same or a similar mounting plate may be used as a spindle mounting bracket 60 for securing the spindle shaft inside the hollow space of the adjusting device 9. As compared to the prior art, the adjusting device according to the invention including a stop feature for limiting the travel stroke of the sliding rail relative to the guide rail may be assembled with lesser parts in a simple and cost-effective manner.

As will become apparent to the person skilled in the art, the features as described above may also be combined in any different manner as specifically claimed in the appended claims.

LIST OF REFERENCE NUMERALS 1 upper rail
2 lower rail
3 locking device
4 positioning pin
5 first mounting piece
6 second mounting piece
7 travel stroke limiter/stop feature
8 hollow space
9 seat slide rail
10 hole in upper rail
20 hole in lower rail
21 hole in lower rail
22 hole in lower rail
23 bottom of lower rail
24 side-wall of lower rail
25 side-wall of lower rail
30 locking pin
31 central locking pin
32 tapered end of locking pin
33 upper end of locking pin
34 radial protrusion of locking pin 30
35 circumferential groove
37 guiding web
38 mounting plate
39 lifting lever
40 cylindrical pin body
41 free end of cylindrical pin body
42 hexagon portion
43 male thread
44 positioning portion
45 nut
46 hexagon nut
47 opening
48 protrusion
49 female thread
50 first mounting plate
51 tapered end of first mounting plate
52 first opening
53 skirt
54 second opening
55 positioning protrusion
60 spindle mounting bracket
61 opening
62 positioning protrusion
65 spindle shaft
66 spindle nut
67 coupling portion

PRIOR ART 100 seat slide rail
101 upper rail
102 lower rail
103 hollow space
105 hole in upper rail 101
106 hole in lower rail 102
107 bottom of upper rail 108 side-wall of upper rail
110 locking device
111 locking pin
112 central locking pin
113 tapered end of locking pin
114 upper end of locking pin
115 radial protrusion of locking pin 111
116 compression spring
117 guiding web
118 mounting plate
119 lifting lever
120 slot in lifting lever
121 handling lever
130 end stop pin
131 riveted head of end stop pin 130
135 positioning pin
136 riveted head of positioning pin 135
137 riser
140 easy-entry-device

What is claimed is:

1. An adjusting device for longitudinal adjustment of a vehicle seat, comprising:
    a guide rail (2) configured to be coupled with a vehicle floor and a sliding rail (1) configured to be coupled with the vehicle seat, wherein the sliding rail (1) is movably guided in a longitudinal direction relative to the guide rail (2) and wherein the guide rail (2) and sliding rail (1) together define a rectangular hollow space (8);
    a stop member (7) mounted to the guide rail (2) for limiting a travel stroke of the sliding rail (1) relative to the guide rail (2); and
    a positioning member (4) for positioning the guide rail (2) relative to the vehicle floor;
    said positioning member (4) having a first end and a second end opposite to the first end and fixed to the guide rail (2); wherein
    a first threaded portion (43) is provided at the second end, extending through a through-hole (22) of the guide rail (2), and
    a positioning portion (44) for positioning the guide rail (2) relative to the vehicle floor is provided at the first end and outside of the hollow space (8), and wherein
    the first threaded portion (43) is in engagement with a second threaded portion (49) which is mated to the first threaded portion (43) and coupled with the stop member (7).

2. The adjusting device for longitudinal adjustment of a vehicle seat as claimed in claim 1, wherein
    the first threaded portion (43) is a male thread formed on a cylindrical portion (40) of the positioning member (4) and extending through an opening (21) formed at a bottom (23) of the guide rail (2), and
    the first threaded portion (43) and the second threaded portion (49) are screwed together, wherein
    the second threaded portion (49) is formed in a through-hole (47) of a counter member (45; 60) provided inside the hollow space (8).

3. The adjusting device for longitudinal adjustment of a vehicle seat as claimed in claim 2, wherein
    the counter member is a mounting bracket (60) of a spindle drive actuated by an electric motor for longitudinal adjustment of the vehicle seat, said mounting bracket (60) being fixed at the bottom (23) of the guide rail (2) inside the hollow space (8), and
    the stop member (7) is formed at a housing (67) of the spindle drive.

4. The adjusting device for longitudinal adjustment of a vehicle seat as claimed in claim 2, wherein
    the counter member is a screw nut (45) disposed inside the hollow spaces (8),
    a protrusion (37) is provided on an inner surface of the sliding rail (1) and inside the hollow space (8), and
    the screw nut (45) and the protrusion (37) are cooperating for limiting the travel stroke of the sliding rail (1) relative to the guide rail (2).

5. The adjusting device for longitudinal adjustment of a vehicle seat as claimed in claim 4, wherein
    the protrusion is formed as a guiding web (37) of a locking device (3) used for locking the position of the sliding rail (1) relative to the guide rail (2) by engagement of a plurality of locking pins (30) with a plurality of openings in the guiding web (37), and
    the guiding web (37) is connected with the inner surface of the sliding rail (1) at a distance to the bottom of the guide rail (2) which is smaller than an axial length of the screw nut (45).

6. The adjusting device for longitudinal adjustment of a vehicle seat as claimed in claim 2, wherein
    an outer diameter of the cylindrical portion (40) is smaller than in inner diameter of the through-hole (22),
    a protrusion (48) is formed at the counter member (45; 60) at a side facing the second end of the positioning member (4), and
    an outer diameter of the protrusion corresponds to the inner diameter of the through-hole (22),
    so that the protrusion (48) is snuggly accommodated in the through-hole (22).

7. The adjusting device for longitudinal adjustment of a vehicle seat as claimed in claim 6, wherein a first mounting plate (5) is provided between the positioning member (4) and the guide rail (1) and outside the hollow space (8), for further positioning the positioning member (4) relative to the guide rail (2).

8. The adjusting device for longitudinal adjustment of a vehicle seat as claimed in claim 7, wherein the first mounting plate (5) comprises
    a through-hole through which the cylindrical portion (40) of the positioning member (4) extends and
    a positioning protrusion (55), which is accommodated in an adjacent one (21) of through-holes (20-22) formed at the bottom (23) of the guide rail (2), for preventing a rotation of the first mounting plate (5).

9. The adjusting device for longitudinal adjustment of a vehicle seat as claimed in claim 8, wherein
    a first mounting plate (5) is provided between the positioning member (4) and the guide rail (1) outside the hollow space (8),
    the positioning member (4) comprises a positioning protrusion (55), which is accommodated in an adjacent one (21) of through-holes (20-22) formed at the bottom (23) of the guide rail (2), and
    the mounting bracket (60) comprises a second positioning protrusion (62), which is accommodated in the adjacent one (21) of through-holes (20-22) formed at the bottom (23) of the guide rail (2), for preventing a rotation of the first mounting plate (5).

10. The adjusting device for longitudinal adjustment of a vehicle seat as claimed in claim 8, wherein
    the counter member is a screw nut (45) disposed inside the hollow spaces (8),
    a protrusion (37) is provided on an inner surface of the sliding rail (1) and inside the hollow space (8), and the screw nut (45) and the protrusion (37) are cooperating for limiting the travel stroke of the sliding rail (1) relative to the guide rail (2).

11. The adjusting device for longitudinal adjustment of a vehicle seat as claimed in claim 10, wherein
the protrusion is formed as a guiding web (37) of a locking device (3) used for locking the position of the sliding rail (1) relative to the guide rail (2) at selectable positions by engagement of a plurality of locking pins (30) with a plurality of openings in the guiding web (37), and
the guiding web (37) is connected with the inner surface of the sliding rail (1) at a distance to the bottom of the guide rail (2) which is smaller than an axial length of the screw nut (45).

12. A method for assembly of an adjusting device for longitudinal adjustment of a vehicle seat, comprising
providing a guide rail (2) of a predetermined hollow profile, a bottom (23) of the guide rail being provided with a plurality of through-holes (20-22);
providing a sliding rail (1) of a predetermined hollow profile mated to the predetermined hollow profile of the guide rail (2);
fixing a counter member (45; 60) to the guide rail (2) or sliding rail (1) and inside the predetermined hollow profile of the guide rail (2) or sliding rail (1);
assembling the guide rail (2) and sliding rail (1) to form the adjusting device for longitudinal adjustment such that a hollow space (8) is formed by the predetermined hollow profiles of the guide and sliding rail, said counter member (45; 60) being disposed inside the hollow space (8);
providing a positioning member (4) having a first end, which is provided with a positioning portion (44), and a second end opposite to the first end, which is provided with a first threaded portion (43); and
fixing the positioning member (4) to the guide rail (2) by inserting the second end in one (22) of the through-holes (20-22) of the guide rail (2) and screwing together the first threaded portion (40) and a second threaded portion (49) which is mated to the first threaded portion (43) such
that the positioning member (4) is coupled with a stop member (7) mounted to the guide rail (2) for limiting the travel stroke of the sliding rail (1) relative to the guide rail (2) and
that the positioning portion (44) is disposed outside of the hollow space (8), for positioning the guide rail (2) relative to a vehicle floor.

13. The method for assembly of an adjusting device for longitudinal adjustment of a vehicle seat as claimed in claim 12, wherein in the step of providing a positioning member (4):
the first threaded portion (43) is a male thread formed on a cylindrical portion (40) of the positioning member (4) and the fixing further comprises extending the first threaded portion (43) through the opening (21) formed at a bottom (23) of the guide rail (2),
in the step of fixing the positioning member (4) to the guide rail (2), the first threaded portion (43) and the second threaded portion (49) are screwed together, and
in the step of fixing the counter member (45; 60) to the guide rail (2) or sliding rail (1), the second threaded portion (49) is formed in a through-hole (47) of the counter member (45; 60) provided inside the hollow space (8).

14. The method for assembly of an adjusting device for longitudinal adjustment of a vehicle seat as claimed in claim 13, wherein in the step of fixing the counter member (45; 60) to the guide rail (2) or sliding rail (1)
the counter member is a mounting bracket (60) of a spindle drive actuated by an electric motor for longitudinal adjustment of the vehicle seat, said mounting bracket (60) being fixed at the bottom (23) of the guide rail (2) inside the hollow space (8), and
the stop member (7) is formed at a housing (67) of the spindle drive.

15. The method for assembly of an adjusting device for longitudinal adjustment of a vehicle seat as claimed in claim 13, wherein
in the step of fixing the counter member (45; 60) to the guide rail (2) or sliding rail (1)
the counter member is a screw nut (45) disposed inside the hollow spaces (8), and
in the step of fixing the positioning member (4) to the guide rail (2), a protrusion (37) is provided on an inner surface of the sliding rail (1) and inside the hollow space (8), and
the screw nut (45) and the protrusion (37) cooperate for limiting the travel stroke of the sliding rail (1) relative to the guide rail (2).

16. The method for assembly of an adjusting device for longitudinal adjustment of a vehicle seat as claimed in claim 15, wherein in the step of fixing the positioning member (4) to the guide rail (2)
the protrusion is formed as a guiding web (37) of a locking device (3) used for locking the position of the sliding rail (1) relative to the guide rail (2) by engagement of a plurality of locking pins (30) with a plurality of openings in the guiding web (37), and
the guiding web (37) is connected with the inner surface of the sliding rail (1) at a distance to the bottom of the guide rail (2) which is smaller than an axial length of the screw nut (45).

17. The method for assembly of an adjusting device for longitudinal adjustment of a vehicle seat as claimed in claim 13, wherein in the step of providing the positioning member (4),
an outer diameter of the cylindrical portion (40) is smaller than in inner diameter of the through-hole (22),
a protrusion (48) is formed at the counter member (45; 60) at a side facing the second end of the positioning member (4), and
an outer diameter of the protrusion corresponds to the inner diameter of the through-hole (22),
so that the protrusion (48) is snuggly accommodated in the through-hole (22).

18. The method for assembly of an adjusting device for longitudinal adjustment of a vehicle seat as claimed in claim 17, wherein in the step of fixing the positioning member (4) to the guide rail (2), a first mounting plate (5) is provided between the positioning member (4) and the guide rail (1) and outside the hollow space (8), for further positioning the positioning member (4) relative to the guide rail (2).

19. The method for assembly of an adjusting device for longitudinal adjustment of a vehicle seat as claimed in claim 18, wherein in the step of providing the first mounting plate (5) the first mounting plate (5) comprises
a through-hole through which the cylindrical portion (40) of the positioning member (4) extends and
a positioning protrusion (55), which is accommodated in an adjacent one (21) of through-holes (20-22) formed at the bottom (23) of the guide rail (2), for preventing a rotation of the first mounting plate (5).

20. The method for assembly of an adjusting device for longitudinal adjustment of a vehicle seat as claimed in claim 19, wherein for assembly of the guide rail (2) and sliding rail (1)
   a first mounting plate (5) is provided between the positioning member (4) and the guide rail (1) outside the hollow space (8),
   the positioning member (4) comprises a positioning protrusion (55), which is accommodated in an adjacent one (21) of through-holes (20-22) formed at the bottom (23) of the guide rail (2), and
   the mounting bracket (60) comprises a second positioning protrusion (62), which is accommodated in the adjacent one (21) of through-holes (20-22) formed at the bottom (23) of the guide rail (2), for preventing a rotation of the first mounting plate (5).

21. The method for assembly of an adjusting device for longitudinal adjustment of a vehicle seat as claimed in claim 19, wherein
   in the step of fixing the counter member (45; 60) to the guide rail (2) or sliding rail (1)
   the counter member is a screw nut (45) disposed inside the hollow spaces (8), and
   in the step of fixing the positioning member (4) to the guide rail (2),
   the protrusion (37) is provided on an inner surface of the sliding rail (1) and inside the hollow space (8), and
   the screw nut (45) and the protrusion (37) cooperate for limiting the travel stroke of the sliding rail (1) relative to the guide rail (2).

22. The method for assembly of an adjusting device for longitudinal adjustment of a vehicle seat as claimed in claim 21, wherein in the step of fixing the positioning member (4) to the guide rail (2)
   the protrusion is formed as a guiding web (37) of a locking device (3) used for locking the position of the sliding rail (1) relative to the guide rail (2) at selectable positions by engagement of a plurality of locking pins (30) with a plurality of openings in the guiding web (37), and
   the guiding web (37) is connected with the inner surface of the sliding rail (1) at a distance to the bottom of the guide rail (2) which is smaller than an axial length of the screw nut (45).

* * * * *